(12) United States Patent
Wang et al.

(10) Patent No.: US 11,218,248 B2
(45) Date of Patent: Jan. 4, 2022

(54) CHANNEL ENCODING METHOD AND DEVICE

(71) Applicant: CHINA ACADEMY OF TELECOMMUNICATIONS TECHNOLOGY, Beijing (CN)

(72) Inventors: Jiaqing Wang, Beijing (CN); Fang-Chen Cheng, Beijing (CN); Di Zhang, Beijing (CN); Shaohui Sun, Beijing (CN)

(73) Assignee: DATANG MOBILE COMMUNICATIONS EQUIPMENT CO., LTD., Beijing (CN)

(*) Notice: Subject to any disclaimer, the term of this patent is extended or adjusted under 35 U.S.C. 154(b) by 94 days.

(21) Appl. No.: 16/623,380

(22) PCT Filed: Apr. 20, 2018

(86) PCT No.: PCT/CN2018/083959
§ 371 (c)(1),
(2) Date: Dec. 16, 2019

(87) PCT Pub. No.: WO2018/228052
PCT Pub. Date: Dec. 20, 2018

(65) Prior Publication Data
US 2020/0177310 A1 Jun. 4, 2020

(30) Foreign Application Priority Data
Jun. 16, 2017 (CN) .......................... 201710459080.0

(51) Int. Cl.
H04L 5/00 (2006.01)
H04L 1/00 (2006.01)
(Continued)

(52) U.S. Cl.
CPC .......... *H04L 1/0057* (2013.01); *H04L 1/0013* (2013.01); *H04L 5/0007* (2013.01); *H04W 72/005* (2013.01); *H04W 84/042* (2013.01)

(58) Field of Classification Search
None
See application file for complete search history.

(56) References Cited

U.S. PATENT DOCUMENTS

2013/0117344 A1  5/2013  Warren
2017/0019214 A1  1/2017  Shen et al.
(Continued)

FOREIGN PATENT DOCUMENTS

CN  105009461 A  10/2015
CN  105164959 A  12/2015
(Continued)

OTHER PUBLICATIONS

ZTE et al. "Rate Matching of Polar Codes for eMBB", 3GPP TSG RAN WG1 Meeting #89, Greece Feb. 13-17, 2017, total 20 pages, R1-1701602.
(Continued)

*Primary Examiner* — Jay P Patel
(74) *Attorney, Agent, or Firm* — Kilpatrick Townsend & Stockton, LLP

(57) ABSTRACT

The present application relates to the technical field of wireless communication, and particularly relates to a channel encoding method and device, for use to solve the problem that at present, there is no physical broadcast channel polar encoding method in a 5G scene. Embodiments of the present application relate to determining a polar mother code length according to transmission resources of a channel; performing polar encoding, according to the polar mother code length, on data needing to be transmitted over the channel to obtain target encoding data; processing the (Continued)

target encoding data according to the length of an actual bearer of the transmission resources; and determining, according to the processed target encoding data, encoding data needing to be transmitted over the channel. The embodiments of the present application achieve determining encoding data according to an actual transmission resource length of a channel, so that the processed encoding data can be ensured to be accurately transmitted over the channel.

20 Claims, 4 Drawing Sheets

(51) Int. Cl.
*H04W 72/00* (2009.01)
*H04W 84/04* (2009.01)

(56) References Cited

U.S. PATENT DOCUMENTS

| | | | |
|---|---|---|---|
| 2017/0156132 A1 | 6/2017 | Wu et al. | |
| 2017/0366199 A1* | 12/2017 | Ge | H04L 1/0053 |
| 2018/0026663 A1* | 1/2018 | Wu | H03M 13/6362 714/776 |
| 2018/0199350 A1* | 7/2018 | Wilson | H04L 1/0072 |
| 2018/0331697 A1* | 11/2018 | Lin | H03M 13/6502 |
| 2018/0351698 A1* | 12/2018 | Lin | H04L 1/0045 |
| 2019/0158219 A1* | 5/2019 | Blankenship | H03M 13/35 |
| 2019/0238270 A1* | 8/2019 | Pan | H04W 74/0833 |
| 2019/0296776 A1* | 9/2019 | Xu | H03M 13/6356 |
| 2019/0296857 A1* | 9/2019 | Gritsenko | H03M 13/3769 |
| 2019/0319641 A1* | 10/2019 | Hwang | H04W 72/0413 |
| 2019/0319745 A1* | 10/2019 | Pan | H04L 5/0053 |
| 2019/0334659 A1* | 10/2019 | Ye | H04L 1/0057 |
| 2019/0357159 A1* | 11/2019 | Pan | H04L 1/1861 |
| 2019/0373589 A1* | 12/2019 | Hwang | H04L 1/00 |
| 2019/0387550 A1* | 12/2019 | Pan | H04L 5/0094 |
| 2019/0393987 A1* | 12/2019 | Hong | H04L 1/0057 |
| 2020/0083987 A1* | 3/2020 | Xu | H04L 1/0068 |
| 2020/0177310 A1* | 6/2020 | Wang | H04L 1/0013 |
| 2020/0228236 A1* | 7/2020 | Xi | H04L 1/0061 |

FOREIGN PATENT DOCUMENTS

| | | |
|---|---|---|
| CN | 105900365 A | 8/2016 |
| CN | 106817195 A | 6/2017 |
| KR | 20140057327 A | 5/2014 |
| TW | 201635720 A | 10/2016 |
| WO | 2015096021 A1 | 7/2015 |

OTHER PUBLICATIONS

NTT DOCOMO "Rate matching design of Polar codes", 3GPP TSG RAN WG1 Meeting #89, Hangzhou, China May 15-19, 2017, total 8 pages, R1-1708491.

Nokia et al. "Rate matching for Polar codes", 3GPP TSG RAN WG1 Meeting #89, Hangzhou, P.R, China May 15-19, 2017, total 5 pages, R1-1708835.

Samsung, "Repetition for Polar Codes", 3GPP TSG RAN WG1 #88bis; R1-1705423; Spokane, WA, Apr. 3-7, 2017.

Samsung, "Consideration on Polar Codes for High Order Modulation", 3GPP TSG RAN WG1 #89, R1-1708050 Hangzhou, China, May 15-19, 2017.

ZTE, "Considerations on Channel Coding for NR-PBCH", 3GPP TSG RAN WG1 Meeting #89, R1-1707184 Hangzhou, China, May 15-19, 2017.

Intel: "Considerations in Polar code design"; 3GPP TSG RAN WG1 Ad hoc; R1-1700385; Spokane, USA, Jan. 16-20, 2017.

ZTE, ZTE Microelectronics: "Further Consideration on Polar codes with maximum mother code"; 3GPP TSG RAN WG1 Meeting #88bis; R1-1704384; Spokane, USA, Apr. 3-7, 2017.

3GPP TS 51.010-1 V4.2.0, 3rd Generation Partnership Project; Technical Specification Group GSM/EDGE Radio Access Network Digital cellular telecommunications system (Phase 2+);Mobile Station (MS) conformance specification;Part 1: Conformance specification, Release 4, total 3229 pages, Jan. 2001.

* cited by examiner

CHANNEL ENCODING METHOD AND DEVICE

The present is a US National Stage of International Application No. PCT/CN2018/083959, filed Apr. 20, 2018, which application claims priority to Chinese Patent Application No. 201710459080.0, filed with the Chinese Patent Office on Jun. 16, 2017 and entitled "Channel Encoding Method and Device", which is hereby incorporated by reference in its entirety.

FIELD

The present application relates to the field of wireless communication technologies and particularly to a channel encoding method and device.

BACKGROUND

The channel encoding is the most basic wireless access technology, and plays an important role in ensuring the reliable transmission of the data. In the existing wireless communication systems, the turbo code, Low Density Parity Check (LDPC) code and polar code are generally used for the channel encoding. The turbo code cannot support the information transmission at too low or too high code rate. However, for the medium and short packet transmission, it is also difficult for the turbo code and the LDPC code to achieve the ideal performance with the limited code length due to their own encoding and decoding characteristics. In terms of implementation, the turbo code and the LDPC code have the higher computation complexity in the process of the encoding and decoding. The polar code is theoretically proven as the good code which can obtain the Shannon capacity and have the relatively simple encoding and decoding complexity, and thus has been used more and more widely.

With the rapid evolution of the wireless communication systems, the future communication systems such as 5th Generation (5G) communication system will have some new characteristics. For example, three typical communication scenarios include the Enhance Mobile Broadband (eMBB), Massive Machine Type Communication (mMTC) and Ultra Reliable Low Latency Communication (URLLC). These communication scenarios put forward the higher requirements on the encoding and decoding performance of the polar code. For the Physical Broadcast Channel (PBCH), its transmission resources are fixed, and the load transmitted over the physical broadcast channel is very important, so the polar encoding scheme used on the physical broadcast channel is a better choice.

The polar code is a linear block code of which the encoding matrix is $G_N$ and the encoding process is $x_0^{N-1} = u_0^{N-1} G_N$, wherein $u_0^{N-1} = (u_0, u_1, K, u_{N-1})$ is a binary row vector of which the length is N (i.e., code length); $G_N$ is a matrix of N*N, and $G_N = F^{\otimes n}$, which is defined as the Kronecker product of n matrices F, wherein $$F = \begin{bmatrix} 1 & 0 \\ 1 & 1 \end{bmatrix}.$$

As can be seen from the above encoding process, the polar encoding scheme can only encode the encoding bits of which the length is the integer power of 2, but the encoding bits may have arbitrary length in the actual application. At present, the polar encoding is still in the theoretical research stage, and there is no polar encoding method for the physical broadcast channel.

To sum up, there is no polar encoding method of the physical broadcast channel in the 5G scenarios at present.

SUMMARY

The present application provides a channel encoding method and device so as to solve the problem in the prior art that there is no polar encoding method of the physical broadcast channel in the 5G scenarios at present.

Based on the above problem, an embodiment of the present application provides a channel encoding method, which includes:

determining a polar mother code length according to a transmission resource of a channel;

performing polar encoding on data to be transmitted on the channel according to the polar mother code length, to obtain target encoded data;

processing the target encoded data according to an actual bearer length of the transmission resource; and determining encoded data to be transmitted on the channel according to the processed target encoded data.

In one embodiment, the determining the polar mother code length according to transmission resource of the channel, includes:

selecting one from a set of polar mother code lengths according to the actual bearer length of the transmission resource;

wherein the actual bearer length of the transmission resource is an actual bearer length of a part of or all Orthogonal Frequency Division Multiplexing (OFDM) symbols of the channel.

In one embodiment, when the polar mother code length is determined according to the actual bearer length of the part of OFDM symbols of the channel;

the processing the target encoded data according to the actual bearer length of the transmission resource, includes:

performing a punching or shortening operation on the target encoded data according to the actual bearer length of the part of OFDM symbols when the actual bearer length of the part of OFDM symbols is no larger than the polar mother code length; or performing a repeating operation on the target encoded data according to the actual bearer length of the part of OFDM symbols when the actual bearer length of the part of OFDM symbols is larger than the polar mother code length.

In one embodiment, the determining encoded data to be transmitted on the channel according to the processed target encoded data, includes:

taking the processed target encoded data as encoded data transmitted on the part of OFDM symbols, and copying the encoded data transmitted on the part of OFDM symbols onto other OFDM symbols of the channel.

In one embodiment, the part of OFDM symbols is one OFDM symbol of the channel.

In one embodiment, when the polar mother code length is determined according to the actual bearer length of all the OFDM symbols of the channel;

the processing the target encoded data according to the actual bearer length of the transmission resource, includes:

performing a punching or shortening operation on the target encoded data according to the actual bearer length of all the OFDM symbols when the actual bearer length of all the OFDM symbols is no larger than the polar mother code length; or performing a repeating operation on the target encoded data according to the actual bearer length of all the OFDM symbols when the actual bearer length of all the OFDM symbols is larger than the polar mother code length.

In one embodiment, the determining encoded data to be transmitted on the channel according to the processed target encoded data, includes:

taking the processed target encoded data as the encoded data to be transmitted on the channel.

In one embodiment, the payloads with different lengths in the channel use the same polar mother code length.

In one embodiment, the polar mother code lengths used by the payloads with different lengths in the channel are same or different.

In another aspect, an embodiment of the present application provides a channel encoding device, which includes:

a determining device configured to determine a polar mother code length according to a transmission resource of a channel;

an encoding device configured to perform polar encoding on data to be transmitted on the channel according to the polar mother code length, to obtain target encoded data;

a processing device configured to process the target encoded data according to an actual bearer length of the transmission resource;

a transmission device configured to determine encoded data to be transmitted on the channel according to the processed target encoded data.

In one embodiment, the determining device is configured to:

select one from a set of polar mother code lengths according to the actual bearer length of the transmission resource; wherein the actual bearer length of the transmission resource is an actual bearer length of a part of or all OFDM symbols of the channel.

In one embodiment, when the determining device determines the polar mother code length according to the actual bearer length of the part of OFDM symbols of the channel;

the processing device is configured to:

perform a punching or shortening operation on the target encoded data according to the actual bearer length of the part of OFDM symbols when the actual bearer length of the part of OFDM symbols is no larger than the polar mother code length; or perform a repeating operation on the target encoded data according to the actual bearer length of the part of OFDM symbols when the actual bearer length of the part of OFDM symbols is larger than the polar mother code length.

In one embodiment, the transmission device is configured to:

take the processed target encoded data as encoded data transmitted on the part of OFDM symbols, and copy the encoded data transmitted on the part of OFDM symbols onto other OFDM symbols of the channel.

In one embodiment, the part of OFDM symbols is one OFDM symbol of the channel.

In one embodiment, when the determining device determines the polar mother code length according to the actual bearer length of all the OFDM symbols of the channel;

the processing device is configured to:

perform a punching or shortening operation on the target encoded data according to the actual bearer length of all the OFDM symbols when the actual bearer length of all the OFDM symbols is no larger than the polar mother code length; or perform a repeating operation on the target encoded data according to the actual bearer length of all the OFDM symbols when the actual bearer length of all the OFDM symbols is larger than the polar mother code length.

In one embodiment, the transmission device is configured to:

take the processed target encoded data as the encoded data to be transmitted on the channel.

In one embodiment, the payloads with different lengths in the channel use the same polar mother code length.

In one embodiment, the polar mother code lengths used by the payloads with different lengths in the channel are same or different.

In another aspect, an embodiment of the present application provides another channel encoding device, which includes:

a memory configured to store program instructions;

a processor configured to invoke the program instructions stored in the memory to perform the process of:

determining a polar mother code length according to a transmission resource of a channel;

performing polar encoding on data to be transmitted on the channel according to the polar mother code length, to obtain target encoded data;

processing the target encoded data according to an actual bearer length of the transmission resource;

determining encoded data to be transmitted on the channel according to the processed target encoded data.

In another aspect, an embodiment of the present application provides a computer storage medium storing the computer executable instructions which are configured to cause the computer to perform any method described above.

In the embodiments of the present application, an appropriate polar mother code length is determined according to the transmission resource of the channel, and the determined polar mother code length is used to encode the data; and the encoded data is processed according to the actual bearer length of the transmission resource, to thereby determine the encoded data according to the actual transmission resource length of the channel and ensure that the encoded data after being processed can be transmitted accurately on the channel.

BRIEF DESCRIPTION OF THE DRAWINGS

In order to illustrate the technical solutions in the embodiments of the present application more clearly, the accompanying figures which need to be used in describing the embodiments will be introduced below briefly. Obviously the accompanying figures described below are only some embodiments of the present application, and other accompanying figures can also be obtained by those ordinary skilled in the art according to these accompanying figures without creative effort.

DETAILED DESCRIPTION

In order to make the objects, technical solutions and advantages of the present application clearer, the present application will be further illustrated below in details with reference to the accompanying drawings. Obviously the described embodiments are merely a part of the embodiments of the present application but not all the embodiments. Based upon the embodiments of the present application, all of other embodiments obtained by those ordinary skilled in the art without creative work pertain to the protection scope of the present application.

Figure 1:
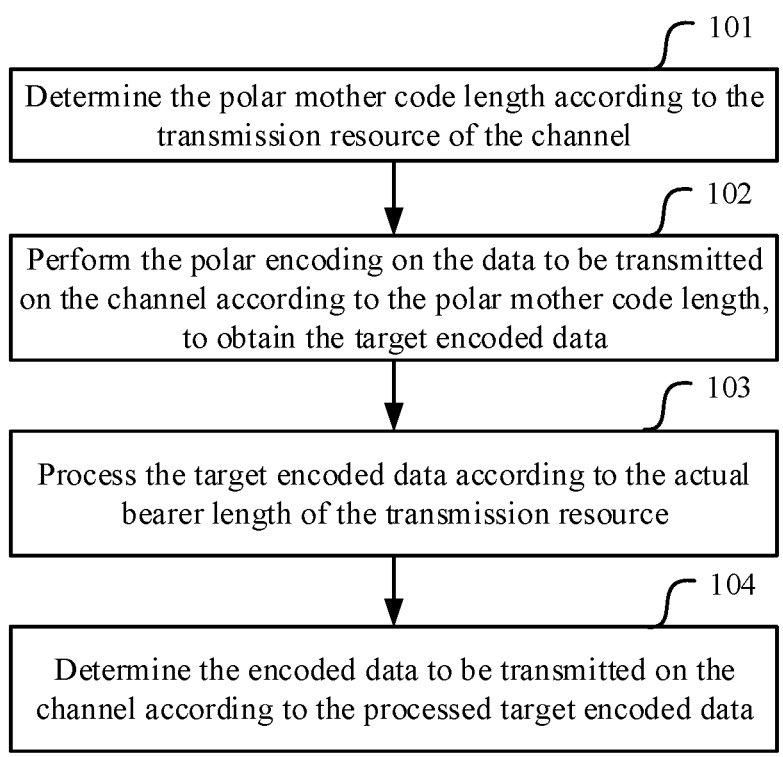
FIG. 1 is a flow chart of a channel encoding method in accordance with an embodiment of the present application.

As shown in FIG. 1, a channel encoding method according to an embodiment of the present application includes the following steps.

Step 101: determine the polar mother code length according to the transmission resource of the channel.

Step 102: perform the polar encoding on the data to be transmitted on the channel according to the polar mother code length, to obtain the target encoded data.

Step 103: process the target encoded data according to the actual bearer length of the transmission resource.

Step 104: determine the encoded data to be transmitted on the channel according to the processed target encoded data.

In the embodiments of the present application, the appropriate polar mother code length is determined according to the transmission resource of the channel, and the data is encoded using the determined polar mother code length. The encoded data is processed according to the actual bearer length of the transmission resource, to thereby determine the encoded data according to the actual transmission resource length of the channel and ensure that the encoded data after being processed can be transmitted accurately on the channel.

It should be noted that the channel encoding method provided by the embodiment of the present application can be applied to the physical broadcast channel, but not limited to the physical broadcast channel, and can also be applied to other channels.

The following is illustrated by taking the method of encoding the physical broadcast channel as an example.

The polar mother code length is the integer power of 2. For example, the polar mother code length can be 2, 4, 8, . . . 256, 512, 1024 and so on.

The actual bearer length of the transmission resources is the number of the bits of the bearer, actually used to transmit the data, in the transmission resource, and is the number of the bits of bearer after the Demodulation Reference Signal (DMRS) overhead of the transmission resources is removed.

For example, the actual bearer length of the transmission resource is the actual bearer length of one Orthogonal Frequency Division Multiplex (OFDM) symbol, and one OFDM symbol occupies 288 carriers. It is assumed that the DMRS overhead is ⅓, then the actual bearer length of the transmission resource is 288*2*⅔=384 bits.

In one embodiment, in the step 101, one polar mother code length is selected from a set of polar mother code lengths according to the actual bearer length of the transmission resource; wherein the actual bearer length of the transmission resource is the actual bearer length of a part of or all OFDM symbols of the physical broadcast channel.

It should be noted that when the polar mother code length is determined according to the actual bearer length of the part of OFDM symbols of the physical broadcast channel, the encoded data is also processed according to the actual bearer length of the part of OFDM symbols when the encoded data is processed; when the polar mother code length is determined according to the actual bearer length of all the OFDM symbols of the physical broadcast channel, the encoded data is also processed according to the actual bearer length of all the OFDM symbols when the encoded data is processed.

The methods of encoding the physical broadcast channel will be illustrated below respectively for different schemes of determining the polar mother code length.

First scheme: the polar mother code length is determined according to the actual bearer length of a part of OFDM symbols of the physical broadcast channel.

Here, the physical broadcast channel uses a plurality of OFDM symbols for transmission.

In one embodiment, in the first scheme, the polar mother code length is determined according to the actual bearer length of one OFDM symbol of the physical broadcast channel.

Specifically, one is selected from a set of polar mother code lengths as the polar mother code length according to the actual bearer length of a part of OFDM symbols of the physical broadcast channel.

When selecting one from a set of polar mother code lengths as the polar mother code length, anyone can be selected as the polar mother code length.

In one embodiment, a length close to the actual bearer length of the part of OFDM symbols can also be selected from the set of polar mother code lengths as the polar mother code length.

Specifically, the length larger than and closest to the actual bearer length of the part of OFDM symbols can be selected from the set of polar mother code lengths as the polar mother code length; or the length smaller than and closest to the actual bearer length of the part of OFDM symbols can be selected from the set of polar mother code lengths as the polar mother code length.

For example, the polar mother code length is determined according to the actual bearer length of one OFDM symbol. One OFDM symbol occupies 288 carriers, and it is assumed that the DMRS overhead is ⅓, then the actual bearer length of one OFDM symbol is 288*2*⅔=384 bits. The selectable lengths contained in the set of polar mother code lengths are the integer power of 2. During determining of the polar mother code length, 256 bits or 512 bits can be selected as the polar mother code length.

In one embodiment, the payloads with different lengths in the physical broadcast channel use the same polar mother code length.

Here, the payload includes the information bits and the Cyclic Redundancy Check (CRC) part.

For example, when the payload length is 70 bits, the determined polar mother code length is 512 bits. Then for the physical broadcast channel, the polar mother code of 512 bits is still used when the payload length is 40 bits.

After the target encoded data is determined, the polar encoding is performed on the data to be transmitted on the physical broadcast channel according to the polar mother code length, to obtain the target encoded data. In the embodiment of the present application, the process of performing the polar encoding on the data to be transmitted on the physical broadcast channel according to the polar mother code length employs the method in the prior art, and will not be described here in details.

It should be noted that the length of the target encoded data, obtained after performing the polar encoding on the data to be transmitted on the physical broadcast channel using the polar mother code length, is equal to the polar mother code length.

In the step 103, In one embodiment, when the actual bearer length of the part of OFDM symbols is no larger than the polar mother code length, the punching or shortening operation is performed on the target encoded data according to the actual bearer length of the part of OFDM symbols; or when the actual bearer length of the part of OFDM symbols is larger than the polar mother code length, the repeating operation is performed on the target encoded data according to the actual bearer length of the part of OFDM symbols.

These cases will be illustrated below respectively.

1. When the actual bearer length of the part of OFDM symbols is no larger than the polar mother code length, the punching or shortening operation is performed on the target encoded data.

It should be noted that the length of the processed target encoded data obtained after performing the punching or shortening operation on the target encoded data is the actual bearer length of the part of OFDM symbols.

Here, the punching and shortening operations employ the methods in the prior art, and will not be described here in details.

For example, the polar mother code length is determined according to the actual bearer length of one OFDM symbol. One OFDM symbol occupies 288 carriers, and it is assumed that the DMRS overhead is ⅓, then the actual bearer length of one OFDM symbol is 288*2*⅔=384 bits. The selectable lengths contained in the set of polar mother code lengths are the integer power of 2. During determining of the polar mother code length, 512 bits can be selected as the polar mother code length. The data is encoded by using 512 bits and the length of the obtained target encoded data is 512 bits, but the actual bearer length of one OFDM symbol is 384 bits, so there is a need to perform the punching or shortening operation on the target encoded data. The length of the target encoded data after the punching or shortening operation is 384 bits.

It should be noted that when the actual bearer length of one OFDM symbol is equal to the polar mother code length, it can be understood that the punched length is 0 bits when performing the punching operation on the target encoded data; or the shortened length is 0 bits when performing the shortening operation on the target encoded data.

2. When the actual bearer length of the part of OFDM symbols is larger than the polar mother code length, the repeating operation is performed on the target encoded data.

It should be noted that the length of the processed target encoded data obtained after performing the repeating operation on the target encoded data is the actual bearer length of the part of OFDM symbols.

Specifically, the difference value between the actual bearer length of one OFDM symbol and the polar mother code length is determined, and the encoded data of N bits is selected from the target encoded data for repeating; wherein N is the difference value between the actual bearer length of one OFDM symbol and the polar mother code length.

For example, the polar mother code length is determined according to the actual bearer length of one OFDM symbol. One OFDM symbol occupies 288 carriers, and it is assumed that the DMRS overhead is ⅓, then the actual bearer length of one OFDM symbol is 288*2*⅔=384 bits. The selectable lengths contained in the set of polar mother code lengths are the integer power of 2. During determining of the polar mother code length, 256 bits can be selected as the polar mother code length. The data is encoded by using 256 bits and the length of the obtained target encoded data is 256 bits, but the actual bearer length of one OFDM symbol is 384 bits, so there is a need to perform the repeating operation on the target encoded data. That is, the encoded data of 128 bits is selected from the target encoded data of which the length is 256 bits, and the target encoded data with a length of 256 bits and the selected encoded data of 128 bits serve as the processed target encoded data, so the length of the target encoded data after the repeating operation is 384 bits.

In another example, the polar mother code length is determined according to the actual bearer length of one OFDM symbol. One OFDM symbol occupies 288 carriers, and it is assumed that the DMRS overhead is ⅓, then the actual bearer length of one OFDM symbol is 288*2*⅔=384 bits. The selectable lengths contained in the set of polar mother code lengths are the integer power of 2. During determining of the polar mother code length, 128 bits can be selected as the polar mother code length. The data is encoded by using 128 bits and the length of the obtained target encoded data is 128 bits, but the actual bearer length of one OFDM symbol is 384 bits, so there is a need to perform the repeating operation on the target encoded data. Since the difference value between the actual bearer length of one OFDM symbol and the polar mother code length is 256 bits, the target encoded data with a length of 128 bits is repeated twice to obtain the processed target encoded data with a length of 384 bits when repeating.

In one embodiment, in an embodiment of the present application, after obtaining the processed target encoded data, the encoded data to be transmitted over the channel is determined by: taking the processed target encoded data as the encoded data transmitted on the part of OFDM symbols, and copying the encoded data transmitted on the part of OFDM symbols onto other OFDM symbols of the channel.

Specifically, the physical broadcast channel uses two OFDM symbols for transmission. It is assumed that the polar mother code length is determined according to the actual bearer length of one OFDM symbol of the physical broadcast channel; and after the target encoded data is processed according to the actual bearer length of one OFDM symbol, the processed target encoded data is taken as the encoded data transmitted on the first OFDM symbol, and the encoded data transmitted on the first OFDM symbol is copied onto the second OFDM symbol directly.

The physical broadcast channel uses four OFDM symbols for transmission. It is assumed that the polar mother code length is determined according to the actual bearer length of one OFDM symbol of the physical broadcast channel; and after the target encoded data is processed according to the actual bearer length of one OFDM symbol, the processed target encoded data is taken as the encoded data transmitted on the first OFDM symbol, and the encoded data transmitted on the first OFDM symbol is copied onto the other three OFDM symbols of this physical broadcast channel directly.

Alternatively, it is assumed that the polar mother code length is determined according to the actual bearer length of two OFDM symbols of the physical broadcast channel; and after the target encoded data is processed according to the actual bearer length of two OFDM symbols, the processed target encoded data is taken as the encoded data transmitted on the first two OFDM symbols, and the encoded data transmitted on the first two OFDM symbols is copied onto the last two OFDM symbols of this physical broadcast channel directly.

Figure 2:
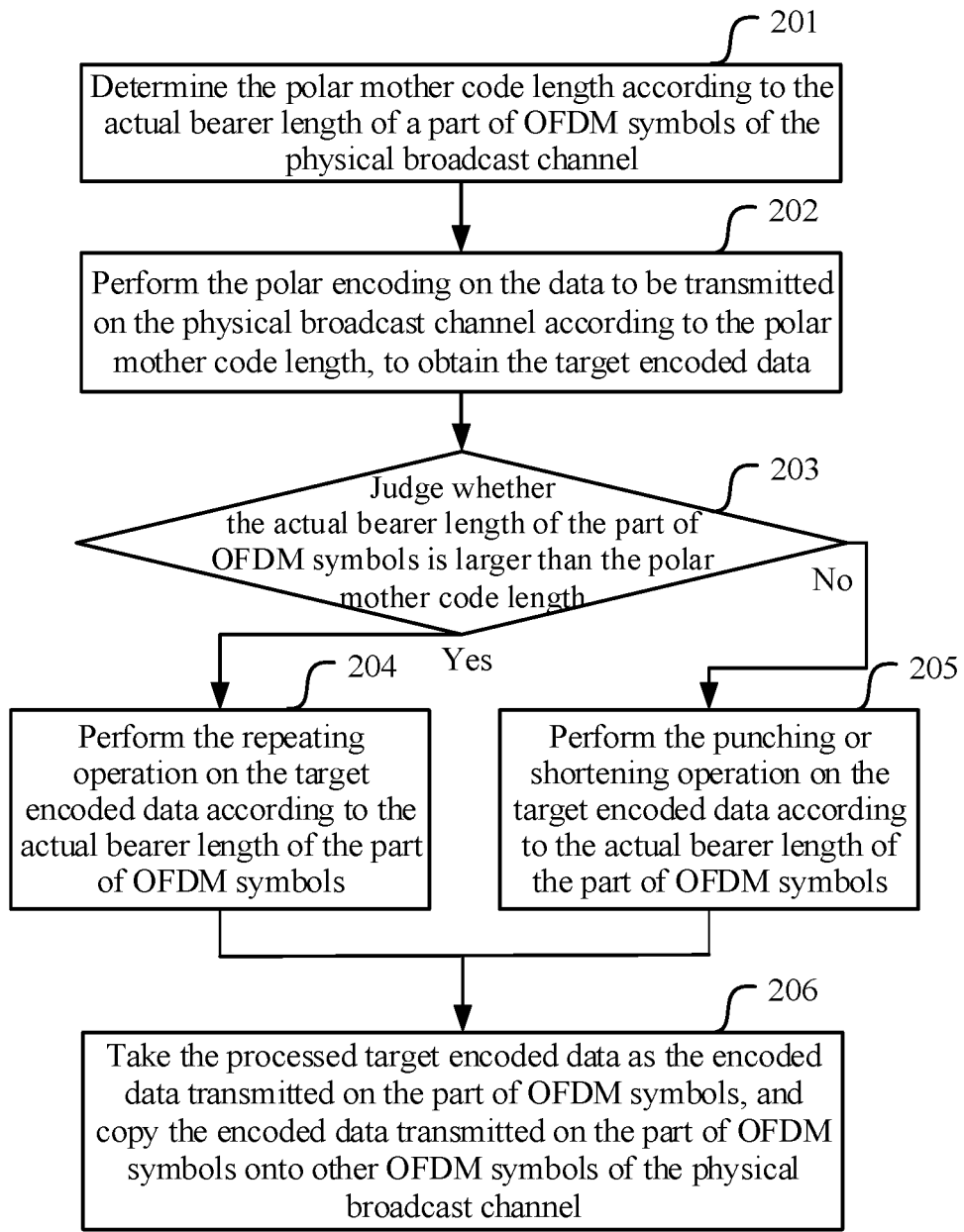
FIG. 2 is an overall flow chart of a first channel encoding method in accordance with an embodiment of the present application.

When the polar mother code length is determined according to the actual bearer length of the partial OFDM symbols, the overall flow chart of the channel encoding method of an embodiment of the present application is as shown in FIG. 2.

Step 201: determine the polar mother code length according to the actual bearer length of a part of OFDM symbols of the physical broadcast channel.

Step 202: perform the polar encoding on the data to be transmitted on the physical broadcast channel according to the polar mother code length, to obtain the target encoded data.

Step 203: judge whether the actual bearer length of the part of OFDM symbols is larger than the polar mother code length, if so, perform step 204; if not, perform step 205.

Step 204: perform the repeating operation on the target encoded data according to the actual bearer length of the part of OFDM symbols; and perform step 206.

Step 205: perform the punching or shortening operation on the target encoded data according to the actual bearer length of the part of OFDM symbols.

Step 206: take the processed target encoded data as the encoded data transmitted on the part of OFDM symbols, and copy the encoded data transmitted on the part of OFDM symbols onto other OFDM symbols of the physical broadcast channel.

The method of encoding the physical broadcast channel of the embodiment of the present application will be illustrated below by a specific embodiment.

First Specific Embodiment

The polar mother code length is determined according to the actual bearer length of one OFDM symbol.

It is assumed that the physical broadcast channel uses two OFDM symbols for transmission; and it is assumed that the DMRS overhead is ⅓ and one OFDM symbol occupies 288 carriers, then the actual bearer length of one OFDM symbol is $288*2*\frac{2}{3}=384$ bits. When the payload length is K=70 bits, the effective code rate is $R\_eff\_max=70/384\approx 1/5.4$. Due to the higher code rate, the length of 512 bits can be selected from the set of polar mother code lengths as the polar mother code length, and the data of the physical broadcast channel of which the payload length is K=70 bits is encoded by using the polar mother code length of 512 bits, to obtain the target encoded data. Since the actual bearer length of one OFDM symbol is smaller than the polar mother code length, the punching operation is performed on the target encoded data to obtain the target encoded data with a length of 384 bits. The target encoded data with the length of 384 bits is taken as the encoded data transmitted on the first OFDM symbol, and the target encoded data of 384 bits is copied onto the second OFDM symbol directly.

When the payload length is K=40 bits, the effective code rate is $R\_eff\_min1=40/384\approx 1/9.5$ when using the mother code length of 512 bits determined according to the actual bearer length of one OFDM symbol, and the effective code rate is $R\_eff\_min2=40/256\approx 1/6.4$ when using the mother code length of 256 bits. For the short information bit length, N=512 and the code rate is lower, which can effectively improve the quality of received signal of the physical broadcast channel in the fading channel. The data of the physical broadcast channel of which the payload length is K=40 bits is encoded by using the polar mother code length of 512 bits, to obtain the target encoded data. Since the actual bearer length of one OFDM symbol is smaller than the polar mother code length, the punching operation is performed on the target encoded data to obtain the target encoded data with a length of 384 bits. The target encoded data with a length of 384 bits is taken as the encoded data to be transmitted on the first OFDM symbol, and the target encoded data of 384 bits is copied onto the second OFDM symbol directly.

Second scheme: the polar mother code length is determined according to the actual bearer length of all OFDM symbols of the physical broadcast channel.

Here, the physical broadcast channel uses a plurality of OFDM symbols for transmission.

In one embodiment, in the second scheme, the polar mother code length is determined according to the actual bearer length of all OFDM symbols of the physical broadcast channel.

Specifically, one is selected from a set of polar mother code lengths as the polar mother code length according to the actual bearer length of all OFDM symbols of the physical broadcast channel.

When selecting one from a set of polar mother code lengths as the polar mother code length, anyone can be selected as the polar mother code length.

In one embodiment, the length close to the actual bearer length of all OFDM symbols of the physical broadcast channel can be selected from a set of polar mother code lengths as the polar mother code length.

Specifically, the length larger than and closest to the actual bearer length of all the OFDM symbols can be selected as the polar mother code length; or the length smaller than and closest to the actual bearing length of all the OFDM symbols can be selected as the polar mother code length.

For example, the physical broadcast channel uses two OFDM symbols for transmission, and the two OFDM symbols occupy 288*2=576 carriers, and it is assumed that the DMRS overhead is ⅓, then the actual bearer length of two OFDM symbols is $576*2*\frac{2}{3}=768$ bits. The selectable lengths contained in the set of polar mother code lengths are the integer power of 2. During determining of the polar mother code length, 512 bits or 1024 bits can be selected as the polar mother code length.

In one embodiment, the payloads with different lengths in the physical broadcast channel use the same or different polar mother code lengths.

Here, the payload includes the information bits and the CRC part.

In an implementation, the same polar mother code length is used for the payloads with different lengths in the physical broadcast channel.

For example, when the payload length is 70 bits, the determined polar mother code length is 512 bits. Then for the physical broadcast channel, the polar mother code of 512 bits is still used when the payload length is 40 bits.

Alternatively, the different polar mother code lengths are used for the payloads with different lengths in the physical broadcast channel.

For example, when the payload length is 70 bits, the determined polar mother code length is 1024 bits. Then for the physical broadcast channel, when the payload length is 50 bits, the determined polar mother code length is 512 bits; when the payload length is 40 bits, the determined polar mother code length is 256 bits.

Alternatively, for a plurality of payloads with different lengths in the physical broadcast channel, some payloads with different lengths use the same polar mother code length.

For example, it is assumed that the payload length is 40-72 bits. In an implementation, two polar mother code lengths can be determined, for example, the first and second polar mother code lengths are determined. The first polar mother code length is selected when the payload length is 40-55 bits; and the second polar mother code length is selected when the payload length is 56-72 bits.

After the target encoded data is determined, the polar encoding is performed on the data to be transmitted on the physical broadcast channel according to the polar mother code length, to obtain the target encoded data. In the embodiment of the present application, the process of performing the polar encoding on the data to be transmitted on the physical broadcast channel according to the polar mother code length employs the method in the prior art, and will not be described here in details.

It should be noted that the length of the target encoded data, obtained after performing the polar encoding on the data to be transmitted on the physical broadcast channel using the polar mother code length, is equal to the polar mother code length.

In the step 103, In one embodiment, when the actual bearer length of all the OFDM symbols is no larger than the polar mother code length, the punching or shortening operation is performed on the target encoded data according to the actual bearer length of all the OFDM symbols; or when the actual bearer length of all the OFDM symbols is larger than the polar mother code length, the repeating operation is performed on the target encoded data according to the actual bearing length of all the OFDM symbols.

These cases will be illustrated below respectively.

1. When the actual bearer length of all the OFDM symbols is no larger than the polar mother code length, the punching or shortening operation is performed on the target encoded data.

It should be noted that the length of the processed target encoded data obtained after performing the punching or shortening operation on the target encoded data is the actual bearer length of all the OFDM symbols.

Here, the punching and shortening operations are methods in the prior art, and will not be described here in details.

For example, it is assumed that the physical broadcast channel uses two OFDM symbols for transmission, and the two OFDM symbols occupy 288*2=576 carriers. It is assumed that the DMRS overhead is ⅓, then the actual bearer length of one OFDM symbol is 576*2*⅔=768 bits. The selectable lengths contained in the set of polar mother code lengths are the integer power of 2. During determining of the polar mother code length, 1024 bits can be selected as the polar mother code length. The data is encoded by using 1024 bits and the length of the obtained target encoded data is 1024 bits, but the actual bearer length of one OFDM symbol is 768 bits, so there is a need to perform the punching or shortening operation on the target encoded data. The length of the target encoded data after the punching or shortening operation is 768 bits.

It should be noted that when the actual bearer length of a plurality of OFDM symbols is equal to the polar mother code length, it can be understood that the punched length is 0 bits when performing the punching operation on the target encoded data; or the shortened length is 0 bits when performing the shortening operation on the target encoded data.

2. When the actual bearer length of all the OFDM symbols is larger than the polar mother code length, the repeating operation is performed on the target encoded data.

It should be noted that the length of the processed target encoded data obtained after performing the repeating operation on the target encoded data is the actual bearer length of all the OFDM symbols.

Specifically, the difference value between the actual bearer length of all the OFDM symbols and the polar mother code length is determined, and the encoded data of N bits is selected from the target encoded data for repeating; wherein N is the difference value between the actual bearer length of all the OFDM symbols and the polar mother code length.

For example, it is assumed that the physical broadcast channel uses two OFDM symbols for transmission, and the two OFDM symbols occupy 288*2=576 carriers. It is assumed that the DMRS overhead is ⅓, then the actual bearer length of two OFDM symbols is 576*2*⅔=768 bits. The selectable lengths contained in the set of polar mother code lengths are the integer power of 2. During determining of the polar mother code length, 512 bits can be selected as the polar mother code length. The data is encoded by using 512 bits and the length of the obtained target encoded data is 512 bits, but the actual bearer length of two OFDM symbols is 768 bits, so there is a need to perform the repeating operation on the target encoded data. That is, the encoded data of 256 bits is selected from the target encoded data with a length of 512 bits, and the target encoded data with the length of 512 bits and the selected encoded data of 256 bits serve as the processed target encoded data, so the length of the target encoded data after the repeating operation is 768 bits.

In another example, it is assumed that the physical broadcast channel uses two OFDM symbols for transmission, and the two OFDM symbols occupy 288*2=576 carriers. It is assumed that the DMRS overhead is ⅓, then the actual bearing length of two OFDM symbols is 576*2*⅔=768 bits. The selectable lengths contained in the set of polar mother code lengths are the integer power of 2. During determining of the polar mother code length, 256 bits can be selected as the polar mother code length. The data is encoded by using 256 bits and the length of the obtained target encoded data is 256 bits, but the actual bearer length of two OFDM symbols is 768 bits, so there is a need to perform the repeating operation on the target encoded data. Since the difference value between the actual bearer length of two OFDM symbols and the polar mother code length is 512 bits, the target encoded data with a length of 256 bits is repeated twice to obtain the processed target encoded data with a length of 768 bits when repeating.

In one embodiment, in an embodiment of the present application, after obtaining the processed target encoded data, the encoded data to be transmitted on the channel is determined by:

taking the processed target encoded data as the encoded data to be transmitted on the channel.

Specifically, the processed target encoded data is taken as the encoded data transmitted on all the OFDM symbols.

Figure 3:
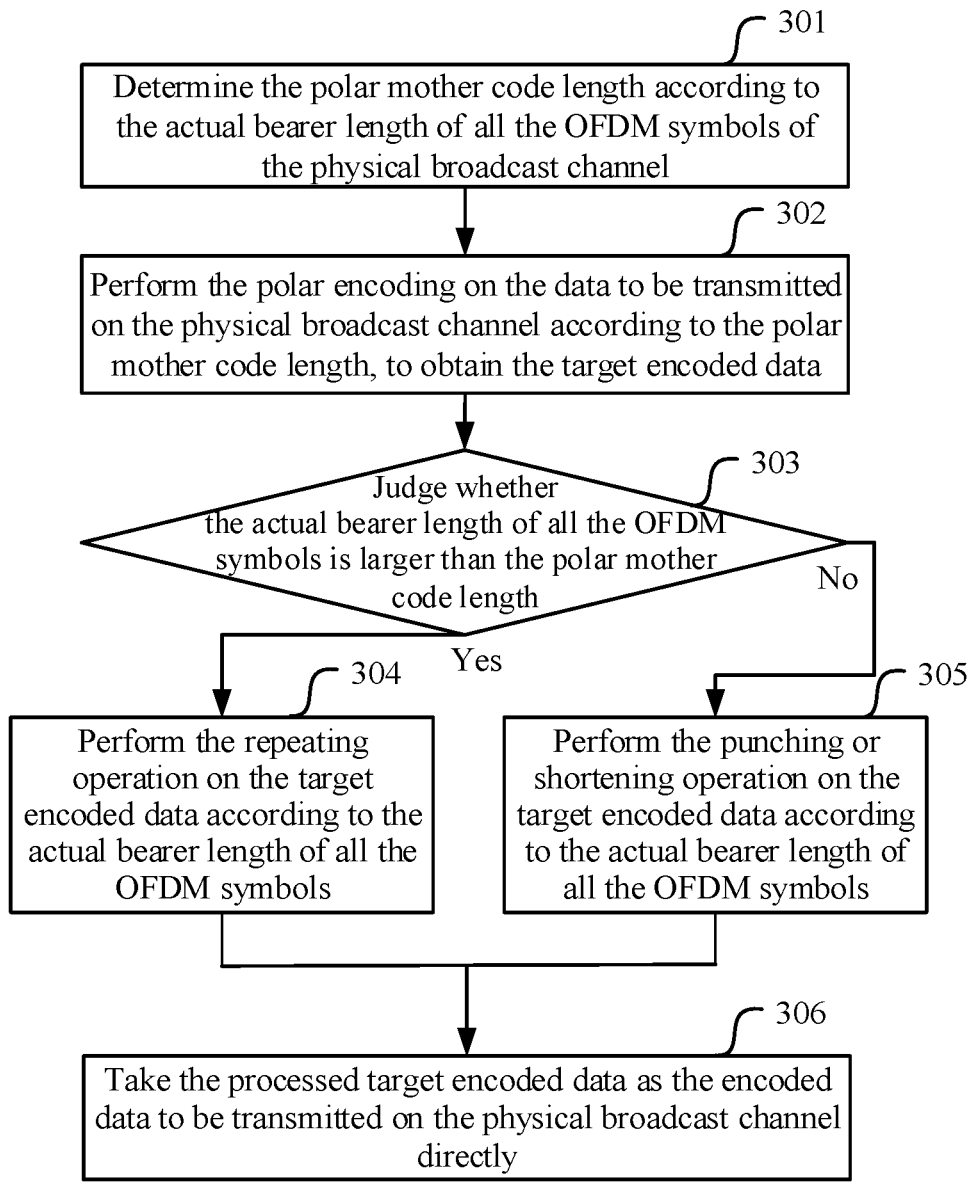
FIG. 3 is an overall flow chart of a second channel encoding method in accordance with an embodiment of the present application.

When the polar mother code length is determined according to the actual bearer length of all the OFDM symbols, the overall flow chart of the channel encoding method of an embodiment of the present application is as shown in FIG. 3.

Step 301: determine the polar mother code length according to the actual bearer length of all the OFDM symbols of the physical broadcast channel.

Step 302: perform the polar encoding on the data to be transmitted on the physical broadcast channel according to the polar mother code length, to obtain the target encoded data.

Step 303: judge whether the actual bearer length of all the OFDM symbols is larger than the polar mother code length, if so, perform step 304; if not, perform step 305.

Step 304: perform the repeating operation on the target encoded data according to the actual bearer length of all the OFDM symbols, and perform step 306.

Step 305: perform the punching or shortening operation on the target encoded data according to the actual bearer length of all the OFDM symbols.

Step 306: take the processed target encoded data as the encoded data to be transmitted on the physical broadcast channel directly.

The method of encoding the physical broadcast channel of the embodiment of the present application will be illustrated below by a specific embodiment.

Second Specific Embodiment

The polar mother code length is determined according to the actual bearer length of all the OFDM symbols; and the payloads with different lengths in the physical broadcast channel use the same polar mother code length.

It is assumed that the physical broadcast channel uses two OFDM symbols for transmission; and it is assumed that the DMRS overhead is ⅓ and two OFDM symbols occupy 288*2=576 carriers, then the actual bearer length of two OFDM symbols is 576*2*⅔=768 bits. When the payload length is K=70 bits, a length of 512 bits can be selected from the set of polar mother code lengths as the polar mother code length, and the effective code rate is R_eff_min=70/512≈1/7.3. The data of the physical broadcast channel of which the payload length is K=70 bits is encoded by using the polar mother code length of 512 bits, to obtain the target encoded data. Since the actual bearer length of two OFDM symbols is larger than the polar mother code length, the repeating operation is performed on the target encoded data to obtain the target encoded data with a length of 768 bits. The target encoded data with the length of 768 bits is taken as the encoded data to be transmitted on the physical broadcast channel directly.

When the payload length is K=40 bits, the effective code rate is R_eff_min=40/512≈1/13 when using the mother code length of 512 bits determined according to the actual bearer length of two OFDM symbols, facilitating the increase in the performance of the physical broadcast channel at the low signal to noise ratio. The data of the physical broadcast channel of which the payload length is K=40 bits is encoded by using the polar mother code length of 512 bits, to obtain the target encoded data. Since the actual bearer length of two OFDM symbols is larger than the polar mother code length, the repeating operation is performed on the target encoded data to obtain the target encoded data with a length of 768 bits. The target encoded data with the length of 768 bits is taken as the encoded data to be transmitted on the physical broadcast channel directly.

Third Specific Embodiment

The polar mother code length is determined according to the actual bearer length of all the OFDM symbols; and the payloads with different lengths in the physical broadcast channel use different polar mother code lengths.

It is assumed that the physical broadcast channel uses two OFDM symbols for transmission; and it is assumed that the DMRS overhead is ⅓ and two OFDM symbols occupy 288*2=576 carriers, then the actual bearer length of two OFDM symbols is 576*2*⅔=768 bits. When the payload length is K=70 bits, a length of 1024 bits can be selected from the set of polar mother code lengths as the polar mother code length, and the effective code rate is R_eff_min=70/1024≈1/14.6. The data of the physical broadcast channel of which the payload length is K=70 bits is encoded by using the polar mother code length of 1024 bits, to obtain the target encoded data. Since the actual bearer length of two OFDM symbols is smaller than the polar mother code length, the punching operation is performed on the target encoded data to obtain the target encoded data with a length of 768 bits. The target encoded data with a length of 768 bits is taken as the encoded data to be transmitted on the physical broadcast channel directly.

When the payload length is K=40 bits, a length of 512 bits can be selected from the set of polar mother code lengths as the polar mother code length, and the effective code rate is R_eff_min=40/512≈1/13. The data of the physical broadcast channel of which the payload length is K=40 bits is encoded by using the polar mother code length of 512 bits, to obtain the target encoded data. Since the actual bearer length of two OFDM symbols is larger than the polar mother code length, the repeating operation is performed on the target encoded data to obtain the target encoded data with a length of 768 bits. The target encoded data with a length of 768 bits is taken as the encoded data to be transmitted on the physical broadcast channel directly.

Based upon the same inventive concept, an embodiment of the present application further provides a channel encoding device. Since the principle solving the problem of this device is similar to this method, the implementations of this device can refer to the implementations of the method, and the repeated description thereof will be omitted here.

Figure 4:
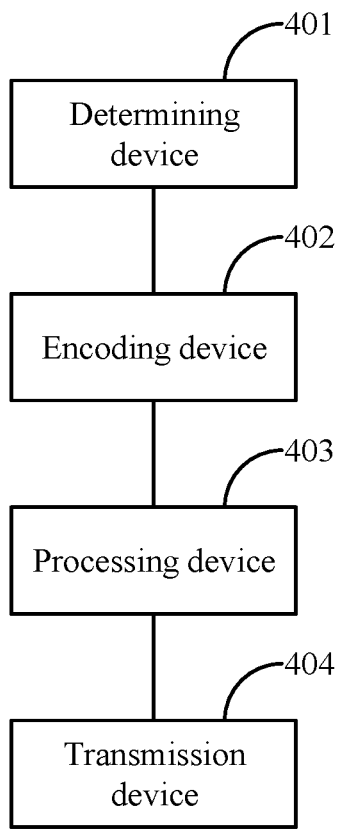
FIG. 4 is a schematic structural diagram of a first channel encoding device in accordance with an embodiment of the present application.

As shown in FIG. 4, the first channel encoding device of an embodiment of the present application includes:

a determining device 401 configured to determine the polar mother code length according to the transmission resource of the channel;

an encoding device 402 configured to perform the polar encoding on the data to be transmitted on the channel according to the polar mother code length, to obtain the target encoded data;

a processing device 403 configured to process the target encoded data according to the actual bearer length of the transmission resource;

a transmission device 404 configured to determine the encoded data to be transmitted on the channel according to the processed target encoded data.

In one embodiment, the determining device 401 is configured to: select one from a set of polar mother code lengths according to the actual bearer length of the transmission resource; wherein the actual bearer length of the transmission resource is the actual bearer length of a part of or all OFDM symbols of the channel.

In one embodiment, when the determining device 401 determines the polar mother code length according to the actual bearer length of the part of OFDM symbols of the channel; the processing device 403 is configured to: perform the punching or shortening operation on the target encoded data according to the actual bearer length of the part of OFDM symbols when the actual bearer length of the part of OFDM symbols is no larger than the polar mother code length; or perform the repeating operation on the target encoded data according to the actual bearer length of the part of OFDM symbols when the actual bearer length of the part of OFDM symbols is larger than the polar mother code length.

In one embodiment, the transmission device 404 is configured to: take the processed target encoded data as the encoded data transmitted on the part of OFDM symbols, and copy the encoded data transmitted on the part of OFDM symbols onto other OFDM symbols of the channel.

In one embodiment, the part of OFDM symbols is one OFDM symbol of the channel.

In one embodiment, when the determining device 401 determines the polar mother code length according to the actual bearer length of all the OFDM symbols of the channel; the processing device 403 is configured to: perform the punching or shortening operation on the target encoded data according to the actual bearer length of all the OFDM symbols when the actual bearer length of all the OFDM symbols is no larger than the polar mother code length; or perform the repeating operation on the target encoded data according to the actual bearer length of all the OFDM symbols when the actual bearer length of all the OFDM symbols is larger than the polar mother code length.

In one embodiment, the transmission device 404 is configured to: take the processed target encoded data as the encoded data to be transmitted on the channel.

In one embodiment, the payloads with different lengths in the channel use the same polar mother code length.

In one embodiment, the polar mother code lengths used by the payloads with different lengths in the channel are same or different.

In the embodiments of the present application, the above devices can be implemented by the processor or other entity devices.

Figure 5:
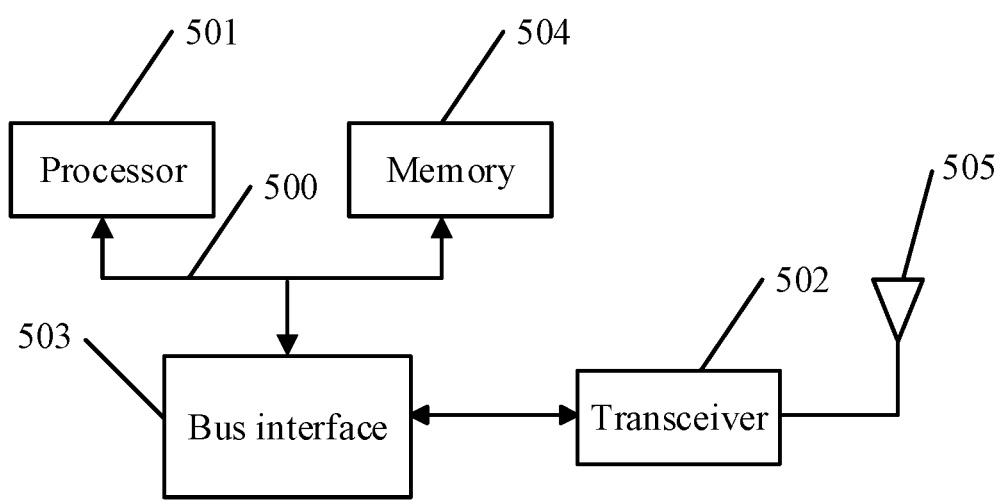
FIG. 5 is a schematic structural diagram of a second channel encoding device in accordance with an embodiment of the present application.

As shown in FIG. 5, the second channel encoding device of an embodiment of the present application includes: a processor 501 configured to transmit and receive the data via a transceiver 502, and read the programs in a memory 504 to perform the process of: determining the polar mother code length according to the transmission resource of the channel; performing the polar encoding on the data to be transmitted on the channel according to the polar mother code length, to obtain the target encoded data; processing the target encoded data according to the actual bearer length of the transmission resource; and determining the encoded data to be transmitted on the channel according to the processed target encoded data; the transceiver 502 configured to receive and transmit the data under the control of the processor 501.

In one embodiment, the processor 501 is configured to: select one from a set of polar mother code lengths according to the actual bearer length of the transmission resource; wherein the actual bearer length of the transmission resource is the actual bearer length of a part of or all OFDM symbols of the channel.

In one embodiment, when the processor 501 determines the polar mother code length according to the actual bearer length of the part of OFDM symbols of the channel; the processor 501 is configured to: perform the punching or shortening operation on the target encoded data according to the actual bearer length of the part of OFDM symbols when the actual bearer length of the part of OFDM symbols is no larger than the polar mother code length; or perform the repeating operation on the target encoded data according to the actual bearer length of the part of OFDM symbols when the actual bearer length of the part of OFDM symbols is larger than the polar mother code length.

In one embodiment, the processor 501 is configured to: take the processed target encoded data as the encoded data transmitted on the part of OFDM symbols, and copy the encoded data transmitted on the part of OFDM symbols onto other OFDM symbols of the channel.

In one embodiment, the part of OFDM symbols is one OFDM symbol of the channel.

In one embodiment, when the processor 501 determines the polar mother code length according to the actual bearer length of all the OFDM symbols of the channel; the processor 501 is configured to: perform the punching or shortening operation on the target encoded data according to the actual bearer length of all the OFDM symbols when the actual bearer length of all the OFDM symbols is no larger than the polar mother code length; or perform the repeating operation on the target encoded data according to the actual bearer length of all the OFDM symbols when the actual bearer length of all the OFDM symbols is larger than the polar mother code length.

In one embodiment, the processor 501 is configured to: take the processed target encoded data as the encoded data to be transmitted on the channel.

In one embodiment, the payloads with different lengths in the channel use the same polar mother code length.

In one embodiment, the payloads with different lengths in the channel use same or different the polar mother code lengths.

In FIG. 5, the bus architecture is represented by the bus 500. The bus 500 can include any numbers of interconnected buses and bridges, and the bus 500 links various circuits including one or more processors represented by the processor 501 and the memory represented by the memory 504. The bus 500 can further link various other circuits such as peripheral device, voltage regulator and power management circuit, which are all well known in the art and thus will not be further described again herein. The bus interface 503 provides an interface between the bus 500 and the transceiver 502. The transceiver 502 can be one element or can be a plurality of elements, i.e., a plurality of receiver and transmitter, and provide the units for communicating with various other devices over the transmission media. The data processed by the processor 501 is transmitted over the wireless medium via the antenna 505, and further, the antenna 505 also receives the data and transfers the data to the processor 501.

The processor 501 is responsible for managing the bus 500 and the general processing, and can further provide various functions including timing, peripheral interface, voltage regulation, power management and other control functions. The memory 504 can be configured to store the data used by the processor 501 when performing the operations.

In one embodiment, the processor 501 can be Central Processing Unit (CPU), Application Specific Integrated Circuit (ASIC), Field-Programmable Gate Array (FPGA) or Complex Programmable Logic Device (CPLD).

The channel encoding method provided by the embodiments of the present application can be applied to the network device. Here, the network device can be a base station (e.g., access point), which means the device in the access network communicating with the wireless terminal via one or more sectors over the air interface. The base station can be configured to perform the interconversion between the received air frame and the IP packet, and used as the router between the wireless terminal and the rest of the access network, wherein the rest of the access network may include Internet Protocol (IP) networks. The base station can further coordinate the attribute management of the air interface. For example, the base station can be the Base Transceiver Station (BTS) in the Global System for Mobile Communication (GSM) or Code Division Multiple Access (CDMA), or can be the NodeB in the Wideband Code Division Multiple Access (WCDMA), or can be the evolutional Node B (NodeB or eNB or e-NodeB) in the Long Time Evolution (LTE), which is not limited in the embodiments of the present application.

An embodiment of the present application further provides a computer storage medium, which can be any available media or data storage device accessible to the computer, including but not limited to magnetic memory (e.g., floppy disk, hard disk, magnetic tape, Magnetic Optical disc (MO) or the like), optical memory (e.g., CD, DVD, BD, HVD or the like), semiconductor memory (e.g., ROM, EPROM, EEPROM, nonvolatile memory (NAND FLASH), Solid State Disk (SSD)) or the like. For example, the computer storage medium can be nonvolatile, i.e., have no content loss after power failure.

Also, the computer storage medium stores the software program which can, when read and executed by one or more processors, implement the solution of any channel encoding method described above in the embodiments of the present application.

The present application has been described above by reference to the block diagrams and/or flow charts showing the methods, devices (systems) and/or computer program products according to the embodiments of the present application. It should be understood that one block shown in the block diagrams and/or flow charts and a combination of the blocks shown in the block diagrams and/or flow charts can be implemented by the computer program instructions. These computer program instructions can be provided to a general-purpose computer, a processor of a dedicated computer and/or another programmable data processing unit to produce a machine, so that the instructions executed by the computer processor and/or another programmable data processing unit create the methods for implementing the functions and/or actions specified in the blocks of the block diagrams and/or flow charts.

Accordingly, the present application can also be implemented by the hardware and/or software (including the firmware, resident software, microcode and the like). Further, the present application can adopt the form of computer program products on the computer usable or computer readable storage medium, which has the computer usable or computer readable program codes implemented in the medium, to be used by the instruction execution system or used in combination with the instruction execution system. In the context of the present application, the computer usable or computer readable storage medium can be any medium, which can contain, store, communicate with, transmit or transfer the programs, to be used by the instruction execution system, apparatus or device, or used in combination with the instruction execution system, apparatus or device.

Evidently those skilled in the art can make various modifications and variations to the present application without departing from the spirit and scope of the present application. Thus the present application is also intended to encompass these modifications and variations therein as long as these modifications and variations to the present application come into the scope of the claims of the present application and their equivalents.

What is claimed is:

1. A channel encoding method, comprising:
   determining a polar mother code length according to a transmission resource of a channel;
   performing polar encoding on data to be transmitted on the channel according to the polar mother code length, to obtain target encoded data;
   processing the target encoded data according to an actual bearer length of the transmission resource; and
   determining encoded data to be transmitted on the channel according to the processed target encoded data.

2. The method of claim 1, wherein determining the polar mother code length according to the transmission resource of the channel, comprises:
   selecting one from a set of polar mother code lengths according to the actual bearer length of the transmission resource;
   wherein the actual bearer length of the transmission resource is an actual bearer length of a part of or all Orthogonal Frequency Division Multiplexing, OFDM, symbols of the channel.

3. The method of claim 2, wherein when the polar mother code length is determined according to the actual bearer length of the part of OFDM symbols of the channel;
   the processing the target encoded data according to the actual bearer length of the transmission resource, comprises:
   performing a punching or shortening operation on the target encoded data according to the actual bearer length of the part of OFDM symbols when the actual bearer length of the part of OFDM symbols is no larger than the polar mother code length; or
   performing a repeating operation on the target encoded data according to the actual bearer length of the part of OFDM symbols when the actual bearer length of the part of OFDM symbols is larger than the polar mother code length.

4. The method of claim 3, wherein the determining encoded data to be transmitted on the channel according to the processed target encoded data, comprises:
   taking the processed target encoded data as encoded data transmitted on the part of OFDM symbols, and copying the encoded data transmitted on the partial OFDM symbols onto other OFDM symbols of the channel.

5. The method of claim 3, wherein the part of OFDM symbols is one OFDM symbol of the channel.

6. The method of claim 5, wherein payloads with different lengths in the channel use a same polar mother code length.

7. The method of claim 2, wherein when the polar mother code length is determined according to the actual bearer length of all the OFDM symbols of the channel;
   the processing the target encoded data according to an actual bearer length of the transmission resources, comprises:
   performing a punching or shortening operation on the target encoded data according to the actual bearer length of all the OFDM symbols when the actual bearer length of all the OFDM symbols is no larger than the polar mother code length; or
   performing a repeating operation on the target encoded data according to the actual bearer length of all the OFDM symbols when the actual bearer length of all the OFDM symbols is larger than the polar mother code length.

8. The method of claim 7, wherein the determining encoded data to be transmitted on the channel according to the processed target encoded data, comprises:
   taking the processed target encoded data as the encoded data to be transmitted on the channel.

9. The method of claim 7, wherein polar mother code lengths used by payloads with different lengths in the channel are same or different.

10. A channel encoding device, comprising:
    a memory configured to store program instructions; and
    a processor configured to invoke the program instructions to:
    determine a polar mother code length according to a transmission resource of a channel;
    perform polar encoding on data to be transmitted on the channel according to the polar mother code length, to obtain target encoded data;

process the target encoded data according to an actual bearer length of the transmission resource;

determine encoded data to be transmitted on the channel according to the processed target encoded data.

11. The device of claim 10, wherein the processor is configured to:

select one from a set of polar mother code lengths according to the actual bearer length of the transmission resource; wherein the actual bearer length of the transmission resource is an actual bearer length of a part of or all OFDM symbols of the channel.

12. The device of claim 11, wherein when the processor determines the polar mother code length according to the actual bearer length of the part of OFDM symbols of the channel;

the processor is configured to:

perform a punching or shortening operation on the target encoded data according to the actual bearer length of the part of OFDM symbols when the actual bearer length of the part of OFDM symbols is no larger than the polar mother code length; or perform a repeating operation on the target encoded data according to the actual bearer length of the part of OFDM symbols when the actual bearer length of the part of OFDM symbols is larger than the polar mother code length.

13. The device of claim 12, wherein the processor is configured to:

take the processed target encoded data as encoded data transmitted on the part of OFDM symbols, and copy the encoded data transmitted on the part of OFDM symbols onto other OFDM symbols of the channel.

14. The device of claim 12, wherein the part of OFDM symbols is one OFDM symbol of the channel.

15. The device of claim 14, wherein payloads with different lengths in the channel use a same polar mother code length.

16. The device of claim 11, wherein when the processor determines the polar mother code length according to the actual bearer length of all the OFDM symbols of the channel;

the processor is configured to:

perform a punching or shortening operation on the target encoded data according to the actual bearer length of all the OFDM symbols when the actual bearer length of all the OFDM symbols is no larger than the polar mother code length; or perform a repeating operation on the target encoded data according to the actual bearer length of all the OFDM symbols when the actual bearer length of all the OFDM symbols is larger than the polar mother code length.

17. The device of claim 16, wherein the processor is configured to:

take the processed target encoded data as the encoded data to be transmitted on the channel.

18. The device of claim 16, wherein polar mother code lengths used by payloads with different lengths in the channel are same or different.

19. A non-transitory computer storage medium, storing computer executable instructions which are configured to cause the computer to perform the method of claim 1.

20. The method of claim 1, wherein the polar mother code length is 512 bits.

* * * * *